E. R. WILLIAMS.
METHOD OF DISINFECTING OR DEODORIZING FLUSHING TANKS.
APPLICATION FILED APR. 1, 1914.

1,175,032.

Patented Mar. 14, 1916.

WITNESSES

INVENTOR
Edward R. Williams
By Fred'k H. Winter
his attorney

UNITED STATES PATENT OFFICE.

EDWARD R. WILLIAMS, OF SHARPSBURG, PENNSYLVANIA.

METHOD OF DISINFECTING OR DEODORIZING FLUSHING-TANKS.

1,175,032.   Specification of Letters Patent.   Patented Mar. 14, 1916.

Application filed April 1, 1914. Serial No. 828,806.

*To all whom it may concern:*

Be it known that I, EDWARD R. WILLIAMS, a resident of Sharpsburg, in the county of Allegheny and State of Pennsylvania, have invented a new and useful Improvement in Methods of Disinfecting or Deodorizing Flushing-Tanks, of which the following is a specification.

This invention relates to a method of disinfecting or deodorizing water-closets, urinals, etc., by automatically dispensing a disinfectant or deodorant solution with the flushing water each time the water-closet or urinal, etc., is flushed.

The purpose of the invention is to provide a method whereby a disinfectant or deodorant solution of substantially uniform strength will be dispensed with the water each time the closet or urinal, etc., is flushed, and until the entire supply of disinfecting material is exhausted.

Generally stated, the method consists in placing in the tank or reservoir which contains the water for flushing the bowls, etc., of the closet or urinal, etc., a receptacle containing a soluble saponaceous disinfecant or deodorant, or a disinfectant or deodorant that has been saponified, thus being soluble to the desired degree, and which is a liquid or a material of such consistency that it tends to seek its own level in the container and is not porous or too easily mixed or saturated with water that may be brought in contact with it, and causing a definite, uniform quantity of water, each time the tank is filled or filling, to be brought into contact with said disinfectant or deodorant within the receptacle, thereby dissolving a small portion from the upper surface only thereof and forming a disinfectant or deodorant solution within the receptacle, and causing a similar definite quantity of said solution to be discharged from the receptacle each time the water is discharged from the tank to flush the closet or urinal bowl.

Figure 1:
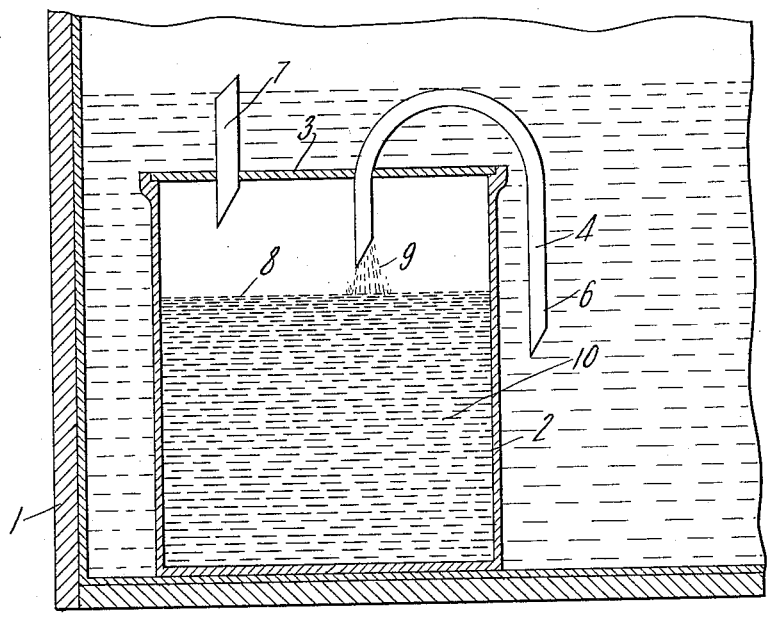
Figure 2:
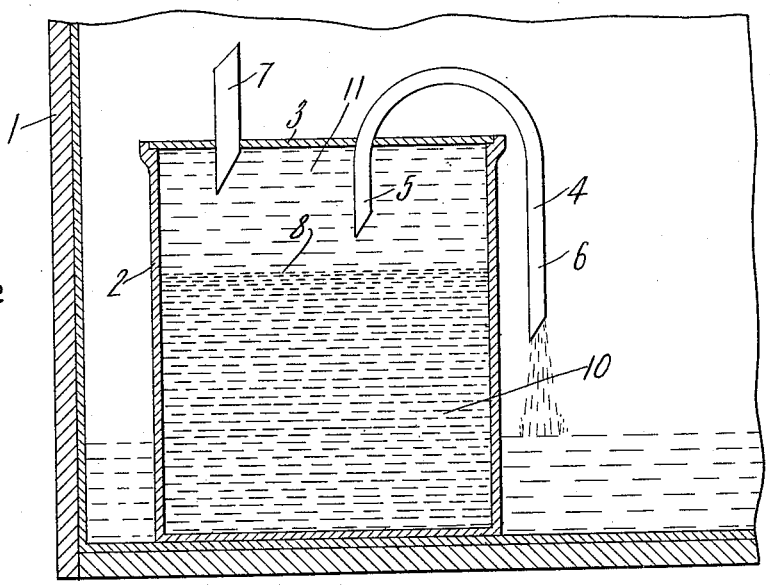

In the accompanying drawing, Fig. 1 is a sectional view of a suitable apparatus placed in a flushing tank for carrying out the invention, showing the action of the apparatus as the tank is filling with water; and Fig. 2 is a similar view, showing the action of the apparatus when the tank is being emptied of water to flush the closet or urinal, etc.

In the drawing, the reference numeral 1 indicates a portion of a flushing tank or reservoir. In carrying out the method I place in such tank a suitable receptacle 2, which may be of any suitable material and shape and of a size to contain a sufficient quantity of disinfectant or deodorant to last for a considerable period of time, say one to three months. This receptacle is closed at the top with a removable lid 3, having attached thereto a siphon tube 4, which has one leg 5 projecting a suitable distance into the receptacle and the other leg 6 depending outside the receptacle.

7 is a suitable vent tube for the admittance of air to, and escape of air from the receptacle. Preferably, the ends of the tubes are cut off on a bevel as shown, in order to prevent the possibility of the water or the solutions bridging the ends thereof, and to cause the water to enter gradually so that only the upper or top surface (indicated at 8) of the body of disinfectant will be washed by the water entering the receptacle.

In carrying out the method the disinfectant or deodorant must be of a soluble saponaceous nature or a disinfectant or deodorant that has been saponified. Various substances or disinfectants or deodorants may be used for this purpose, such as cresylic or carbolic acid or similar products, pine products, coal-tar products, and other well known disinfectants or deodorants. The disinfectant or deodorant of whatever specific nature, is saponified by combining with an alkili or by any process of saponifying oils or chemicals, etc. The saponification of the disinfectant or deodorant causes it to be soluble to the degree necessary to produce the uniform solutions from its upper or top surface when the jet of water is brought in contact with said surface, and at the same time leaves the body of the disinfectant or deodorant non-saturable. The saponified product has the properties that water will not easily saturate it, that it is non-porous, and that the water cannot materially disturb the same, which are due to its physical characteristics. It is preferably some material which tends to seek its own level and maintain close contact with the walls of the container and thereby prevent the water from contacting with it anywhere than on its exposed level upper surface. Specifically it is in the form of a heavy liquid of the consistency of a heavy oil or thin syrup, although any saponified disinfecting or deodorizing material which seeks its own level and is exposed in the container only at its top surface will do. As a consequence, the body of the deodorant or disinfectant has a substantially uniform surface area exposed to the water at all times, although the jet of water may form a slight depression at the point where it strikes the disinfectant or deodorant, it cannot materially disturb it, owing to the deodorant or disinfectant being heavier than the water and of a soapy nature which tends to prevent the water from entering the body of the deodorant or disinfectant. Hence, the water will only come in contact with the exposed top surface 8 of the body of the saponified disinfectant or deodorant, and will wash a small portion from the top surface thereof and dissolve the same as the water enters the receptacle, thereby converting the water into a saturated solution of the disinfectant or deodorant. Further dissolution then ceases until the whole or a portion of the said solution has been withdrawn and replaced by fresh water, which takes place when the closet or urinal, etc., is flushed and the flushing tank refilled.

The charge of solution is withdrawn and the receptacle recharged with water by means of the siphon tube 4. When the tank is filling and the level of the water gets above the bend or top of the siphon-tube it enters the receptacle through the siphon-tube in a small stream or jet 9 (Fig. 1) and impinges against the exposed level top surface 8 of the saponified disinfectant or deodorant 10, thereby dissolving a small portion from the top surface only without disturbing the body of the disinfecting material and without attacking the disinfecting material at the side walls of the container, until the fresh water becomes a saturated solution 11 of the disinfectant or deodorant. The quantity of water is equal only to the quantity of solution that was discharged at the last flushing, or, sufficient to fill the space between the lid of the receptacle and the end of the siphon-tube 5 within the receptacle. When the receptacle is filled with the concentrated or saponified product the first time and when it is recharged with the same prior to being placed in the flushing tank it is only filled to a point in proximity to the end of the siphon-tube 5, thus allowing space for the first solution to be formed. When the receptacle is submerged within the flushing tank this operation takes place, each time the tank is emptied and filled. Each time the tank is emptied the solution within the receptacle is drawn out to a point level with the short side of the beveled end of the shorter leg 5 of the siphon-tube and each time the tank is refilled the receptacle is refilled with a quantity of water equal to the quantity of solution that was discharged, so that the solution within the receptacle is always of the same strength, that is, a saturated solution. And in consequence of this fact, and the action of the water in merely washing a portion from the upper level surface of the concentrated saponified disinfectant or deodorant and dissolving the same without permeating the body thereof or attacking same except upon its top surface, the strength of the concentrated or saponified disinfectant or deodorant remains uniform to replenish the solution, or rather form new solutions of the water each time it enters the receptacle, until the concentrated disinfectant or deodorant is finally exhausted, when a new supply will have to be placed in the receptacle.

I am aware that the automatic siphoning of disinfectants from a receptacle into a flushing tank is not new. In the prior practice, however, the disinfectants used have been in the form of granular or crystal salts, or liquid solutions of said salts, or materials of a pasty consistency, and of a soluble, porous, and easily saturable nature, so that the first few fillings of water into the receptacle form very strong solutions, after which the solutions keep getting weaker and weaker until in a very short time there remains no effective disinfectant to replenish the fresh water as it enters the receptacle. This is due to the fact that the water is able to attack the whole surface or permeate the entire body of the disinfectant or deodorant and dissolve it in its entirety, and it is due to this fact that heretofore siphonic and other similar disinfecting apparatus to be automatically operated and replenished by the flushing water have not been successful, as it is impractical to put a sufficient quantity of such disinfectant in a receptacle that would be small enough to be placed within such tanks as are used for flushing water-closets, urinals, etc., and make them last long enough to be satisfactory, and it would be necessary to have them replenished every few days, which would become a trouble and be too expensive.

In some instances heretofore disinfectants of a pasty consistency or solid disinfectants may have been used, but in no instance has there ever been used a disinfectant or deodorant of a saponified nature of greater specific gravity than water and sufficiently fluid to seek its own level and thereby maintain a uniform top surface area exposed to the action of the water entering the receptacle, and also maintain close contact with the side walls and bottom of the container to thereby prevent the water from contacting with it anywhere except on its exposed level top surface. To produce uniform disinfecting or deodorizing solutions, it is necessary, first, that there be withdrawn each time the same quantity of solution as the quantity of water that enters the container; second, that the disinfectant or deodorant must maintain a uniform surface area exposed to the action of the water from the time when the receptacle is first loaded with the disinfecting or deodorizing material to the time when this material is exhausted; third, that the disinfectant or deodorant must produce solutions with sufficient rapidity, that is, that it must be capable of producing a solution in the time that elapses while the flushing tank is filling, so that it will be impossible to flush the tank without disinfecting or deodorizing the urinal or water closet; and fourth, that the disinfectant or deodorant must have a consistency heavy enough to prevent the jet of water from penetrating, disturbing or mixing with the entire body of material. The disinfecting or deodorizing material used in carrying out this invention is heavier than water and is also sufficiently fluid to flow toward the side walls of the receptacle, so that it keeps only the top surface area of the material exposed to the water which enters the receptacle. It is also of a saponaceous nature, so that it dissolves very quickly from its exposed top surface as the water enters the receptacle and thereby forms solutions almost instantly, this being due principally to its soapy nature.

With my method I have overcome all the defects in prior methods such as those above referred to, and am able to use a receptacle that is small enough to be placed in any of the usual tanks used for flushing closets, urinals, etc., which I might mention are practically filled with working parts, leaving very little space to place a receptacle of any considerable size, a quart receptacle being about the largest capacity that can be placed in most such tanks.

As previously explained I am able to maintain a solution of uniform strength as long as there remains any concentrated disinfectant or deodorant within the receptacle, which will be from one to three months, depending upon the number of times the tank is flushed.

Any form of receptacle so arranged as to cause a sufficient quantity of water to be brought in contact with the soluble saponaceous or saponified disinfectant or deodorant, when the tank is filled or filling, and so arranged that a similar amount of disinfectant or deodorant solution will be dispensed from said receptacle each time the water is discharged from said flushing tank, will serve the purpose of my method.

By a rapidly soluble, saponaceous or saponified disinfecting or deodorizing product in the claims is meant one which forms a sufficiently strong solution within the shortest period of time which occurs between successive flushings of tanks in the normal use of closets.

What I claim is:—

1. The method of disinfecting or deodorizing water closets, urinals, etc., consisting of placing in the flushing water or reservoir for containing the flushing water, a receptacle containing a disinfecting or deodorizing product of a soluble saponaceous or saponified nature in a homogeneous body impermeable to and non-saturable by water and sufficiently fluid to tend to seek a level and maintain close contact with the walls of the receptacle, causing a definite uniform quantity of the flushing water to enter the receptacle and come in contact with said disinfecting or deodorizing product and be thereby converted into a disinfectant or deodorant solution, and causing a similar quantity of said solution to be withdrawn from said receptacle each time the water is discharged from the receptacle.

2. The method of disinfecting or deodorizing flushing water, consisting of placing in a tank or reservoir for containing the flushing water, a receptacle containing a disinfecting or deodorizing material of a rapidly soluble saponaceous or saponified nature, of a heavier gravity than water and sufficiently fluid to seek its own level and keep close contact with the side-walls of the receptacle and thereby maintain a substantially uniform surface area exposed to the water, and causing a definite uniform quantity of the flushing water to come in contact with said disinfecting or deodorizing material and be thereby converted into a disinfectant or deodorant solution, and causing a similar quantity of said solution to be withdrawn from said receptacle each time the tank or reservoir is emptied.

In testimony whereof, I have hereunto set my hand.

EDWARD R. WILLIAMS.

Witnesses:
   ELBERT L. HYDE,
   WILLIAM B. WHARTON.

Copies of this patent may be obtained for five cents each, by addressing the "Commissioner of Patents, Washington, D. C."